(12) United States Patent
Ely et al.

(10) Patent No.: US 6,366,060 B1
(45) Date of Patent: Apr. 2, 2002

(54) MOSFET CONTROL CIRCUIT FOR DUAL WINDING ALTERNATOR

(75) Inventors: Jeffrey Alan Ely, Kokomo; Justin B. Lybbert, Fishers; Tillasthanam V. Sriram, Carmel; Steven Robert Mc Mullen, Anderson, all of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/636,348

(22) Filed: Aug. 10, 2000

(51) Int. Cl.[7] .......................... H02H 7/06; H02H 7/085; H02H 7/09; H02H 7/025; H02P 9/08; H02P 9/10; H02P 9/44; H02P 11/04

(52) U.S. Cl. ........................................... 322/25; 322/28

(58) Field of Search ..................... 322/25, 28

(56) References Cited

U.S. PATENT DOCUMENTS

| | | | |
|---|---|---|---|
| 5,132,604 A | * | 7/1992 | Shimane et al. ............. 322/10 |
| 5,420,537 A | * | 5/1995 | Weedon et al. ............ 330/251 |
| 5,448,154 A | * | 9/1995 | Kanke et al. ................. 322/28 |
| 5,668,707 A | * | 9/1997 | Barrett ......................... 363/44 |
| 5,719,487 A | * | 2/1998 | Sato et al. .................... 322/28 |
| 5,903,066 A | * | 5/1999 | Enjeti et al. ................ 307/105 |
| 5,914,572 A | * | 6/1999 | Qian .......................... 315/307 |
| 6,069,804 A | * | 5/2000 | Ingman et al. ................ 363/21 |
| 6,111,390 A | * | 8/2000 | Inaba et al. ................... 322/28 |
| 6,134,131 A | * | 10/2000 | Poon et al. ................. 363/127 |

FOREIGN PATENT DOCUMENTS

| | | |
|---|---|---|
| DE | 32 27 602 A1 | 2/1983 |
| JP | 6477497 | * 3/1989 |

OTHER PUBLICATIONS

A High Performance Automobile Generator featuring end–shield Fitted Enhanced Fitted Enhanced Power Circuit (DCB) and Control electronics, 1998.
A Vehicle Electric Power Generator System with Improved Output Power and Efficiency, IEEE1 AS 1998.

* cited by examiner

*Primary Examiner*—Nestor Ramirez
*Assistant Examiner*—Julio R. Gonzalez
(74) *Attorney, Agent, or Firm*—Margaret A. Dobrowitsky

(57) ABSTRACT

A MOSFET control circuit for use in generators with dual windings. The MOSFET switch consists of two or more MOSFETs connected between the upper and lower windings of a three-phase generator to permit the windings to operate in series or in parallel. The gate of one of the MOSFETs is controlled by a gate drive circuit that turns the MOSFET ON when the windings are to operate in series. The MOSFET is OFF when the windings are to operate in parallel.

2 Claims, 3 Drawing Sheets

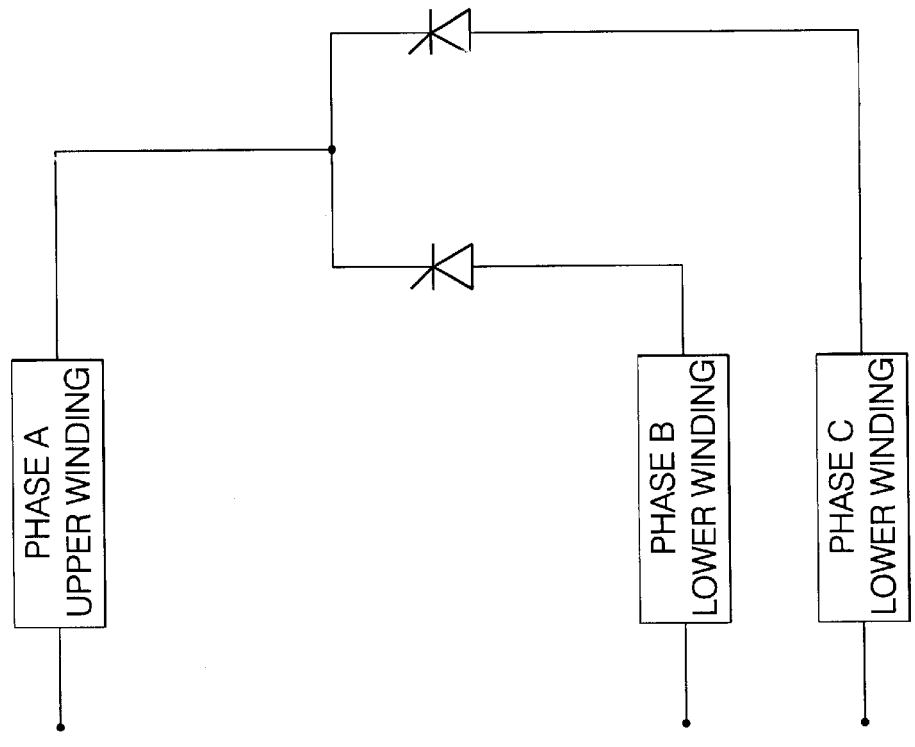
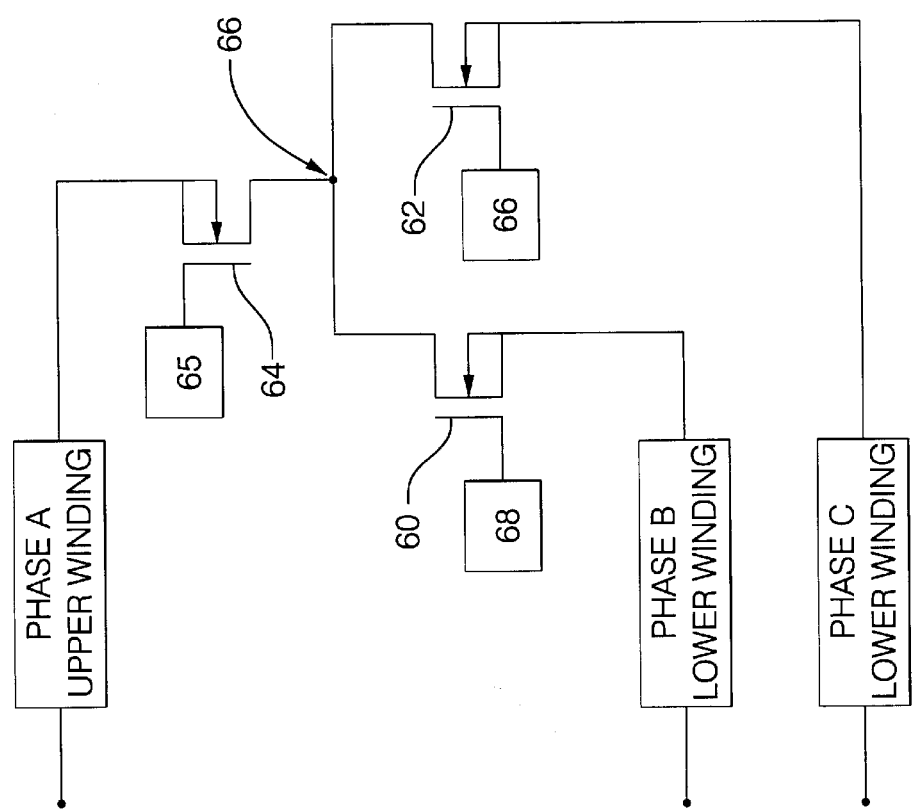
FIG. 4A
FIG. 4B
PRIOR ART

MOSFET CONTROL CIRCUIT FOR DUAL WINDING ALTERNATOR

TECHNICAL FIELD

The present invention relates to a MOSFET control circuit for a dual winding generator.

BACKGROUND OF THE INVENTION

Lundell-type electric generators have long been used in the automotive industry to provide electrical power for automobiles and trucks. The typical automotive generator today is a self-excited three phase synchronous Lundell-type generator. These generators internally comprise parallel sets of three phase windings. Due to consumer demand for comfort and convenience and complex control systems required to meet governmental regulation, electrical demands on modern automobiles have increased substantially over the years.

These generators must provide sufficient current at both high and low engine speeds. The current which such a generator can produce with the engine running at very high speeds is limited by the number of winding turns in the coils. For a generator to produce a high level of current at very high engine speeds, its coil must only have a few winding turns. The coil must have a larger number of winding turns, however, to produce sufficient current at low engine speeds.

To design generators for motor vehicles capable of producing high levels of current at high engine speeds but still capable of producing sufficiently high levels of current at low engine speeds, the coil can be divided into two windings connected in series at low engine speeds and in parallel at higher engine speeds. The prior art teaches the use of circuits containing thyristors, such as silicon controlled rectifiers ("SCRs"), to allow the windings of the generator to function as if they were connected in series or in parallel. See German Patent DE 32 27 602 A1 to Marelli Autronica S.p.A., Alternating Current Generator, Particularly for Motor Vehicles, which is hereby incorporated by reference. Thyristor circuits allow the windings to operate in series at lower speeds and in parallel at higher speeds.

Thyristor circuits, however, have their own disadvantages. First, thyristors are limited in operation up to temperatures of 125° C. and typically they do not operate at higher temperatures without substantial derating of their operational limits. Second, thyristors allow current to flow in only one direction in the circuit and thus do not permit control of overvoltage, as they cannot be used as possible bypassing bidirectional devices to limit system overvoltages that may occur due to sudden load changes. Third, thyristor circuits are less efficient than other types of circuits, such as MOSFET circuits, when operating in series. Fourth, thyristors are current-controlled and require more power to control than voltage-controlled devices, such as MOSFETs.

SUMMARY OF THE INVENTION

Accordingly, the objective of the invention is to provide a MOSFET control circuit as a substitute for thyristors for use in generators with dual windings. A control circuit in accordance with the present invention is characterized by the features specified in claim 1.

The control circuit of the present invention includes three subcircuits. The first subcircuit uses two or more MOSFETs connected between the upper and lower windings of the generator to permit the windings to operate in series or in parallel. The other two subcircuits are gate drive circuits that control the operation of the MOSFETs. One subcircuit controls when the windings operate in series or in parallel, depending on speed and load. The other subcircuit provides overvoltage control by operating the MOSFETS as diodes only in the normal mode, but permitting bidirectional current flow to prevent over-voltage resulting from sudden load changes.

The circuit of the present invention is for use with a three-phase, dual winding generator. There are therefore three sets of windings, the sets typically called phase A, phase B, and phase C. In addition, each set of windings has a lower winding and an upper winding. Thus, in the circuit, there is a lower winding and an upper winding that correspond to phase A, phase B, and phase C.

In one embodiment of the present invention, the corresponding lower and upper windings are 180 degrees out of phase with respect to each other. These lower and upper windings are connected to each other by a semiconductor switch consisting of two (MOSFETS used with the present invention may be of either the P or N channel type) MOSFETs, in which the drain terminals of the two MOSFETS are connected to each other. The gate terminal of one MOSFET is controlled by a gate drive circuit that operates the windings in series or in parallel. The gate terminal of the other MOSFET is controlled by a gate drive circuit that permits current to flow in either direction under excessive DC voltage situations while at the same time permitting current flow in only one direction (from Source to Drain Only) for operation in series connection, the normal mode of operation.

In a second embodiment of the present invention, each corresponding lower winding and upper winding is in phase with respect to each other. In this embodiment, the lower windings corresponding to two phases are connected to the upper winding corresponding to the third phase by three MOSFETs. Each of the three MOSFETs is connected to the drain of the other two MOSFETs. The gate terminal of one MOSFET is controlled by a gate drive circuit that operates the windings in series or in parallel. The gate terminals of the other two MOSFETs are controlled by gate drive circuits that permit current to flow in either direction under excessive DC voltage situations while permitting diode-like (unidirectional current flow) behavior under normal series mode of operation.

BRIEF DESCRIPTION OF THE DRAWINGS

The present invention will now be described, by way of example, with reference to the accompanying drawings, in which:

FIG. 4A is a circuit diagram showing a second embodiment of the present invention in which the two thyristors are replaced with three MOSFETS; and FIG. 4B is an circuit diagram of a prior art circuit to which FIG. 4A is equivalent.

DETAILED DESCRIPTION OF THE PREFERRED EMBODIMENT

Figure 1:
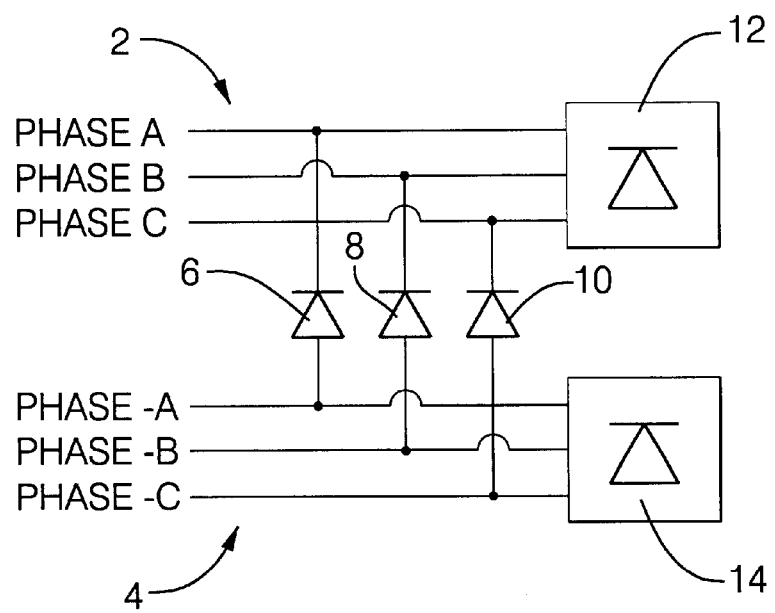
FIG. 1 is a circuit diagram of a conventional prior art three phase circuit connected by three thyristors.

Referring now to the drawings, FIG. 1 illustrates a conventional three phase circuit. In FIG. 1, the corresponding lower and upper windings 2 and 4 are connected to each other by thyristors 6, 8, and 10. The lower and upper windings are 180 degrees out of phase with each other. When continuously pulsed, the thyristors act as diodes and the windings operate in series. When the thyristors are not pulsed, the windings operate in parallel. Diode Bridges 12 and 14 rectify the AC signals to produce a DC output.

Figure 2:
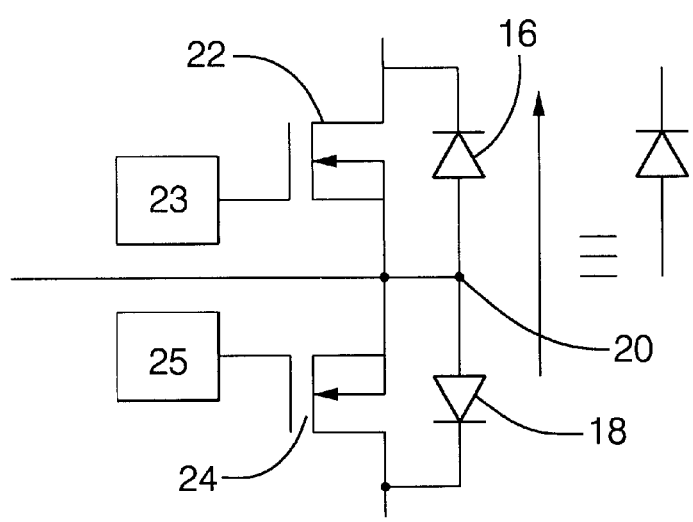
FIG. 2 is a schematic drawing of the present invention diagram showing the operation two MOSFETS in a first embodiment of the present invention.

FIG. 2 shows a schematic diagram of the control circuit of the present invention As can be seen, it comprises two MOSFETs, 16 and 18, (shown with their respective body diode) which operate the circuit in series or parallel to allow current flow in both directions of the circuit. In FIG. 2, two N-channel MOSFETs 16 and 18 are connected to each other by their source terminals (20), although they can also be connected by their drain terminals. Control of the gates of the MOSFETS, 22 and 24, is performed by two gate control circuits, 23 and 25. This control determines whether the circuit operates in series or parallel mode and allows the MOSFETs to conduct current in either or both directions. The first gate control circuit 23 controls gate 22 of MOSFET 16 so that it is ON only when the current flow through it is from source to drain. Thus, current flow in the composite device normally is permitted only in the direction of the arrow. The second gate control circuit 25 controls gate 24 of MOSFET 18 so that it is high whenever the MOSFET switch combination has to act as a diode. Under excessive voltage situations, both 22 and 24 are high, allowing current flow in either direction across the composite device. The MOSFET switch combination of the present invention can also be created by connecting the drains of the two MOSFETs, together instead of the sources.

Figure 3:
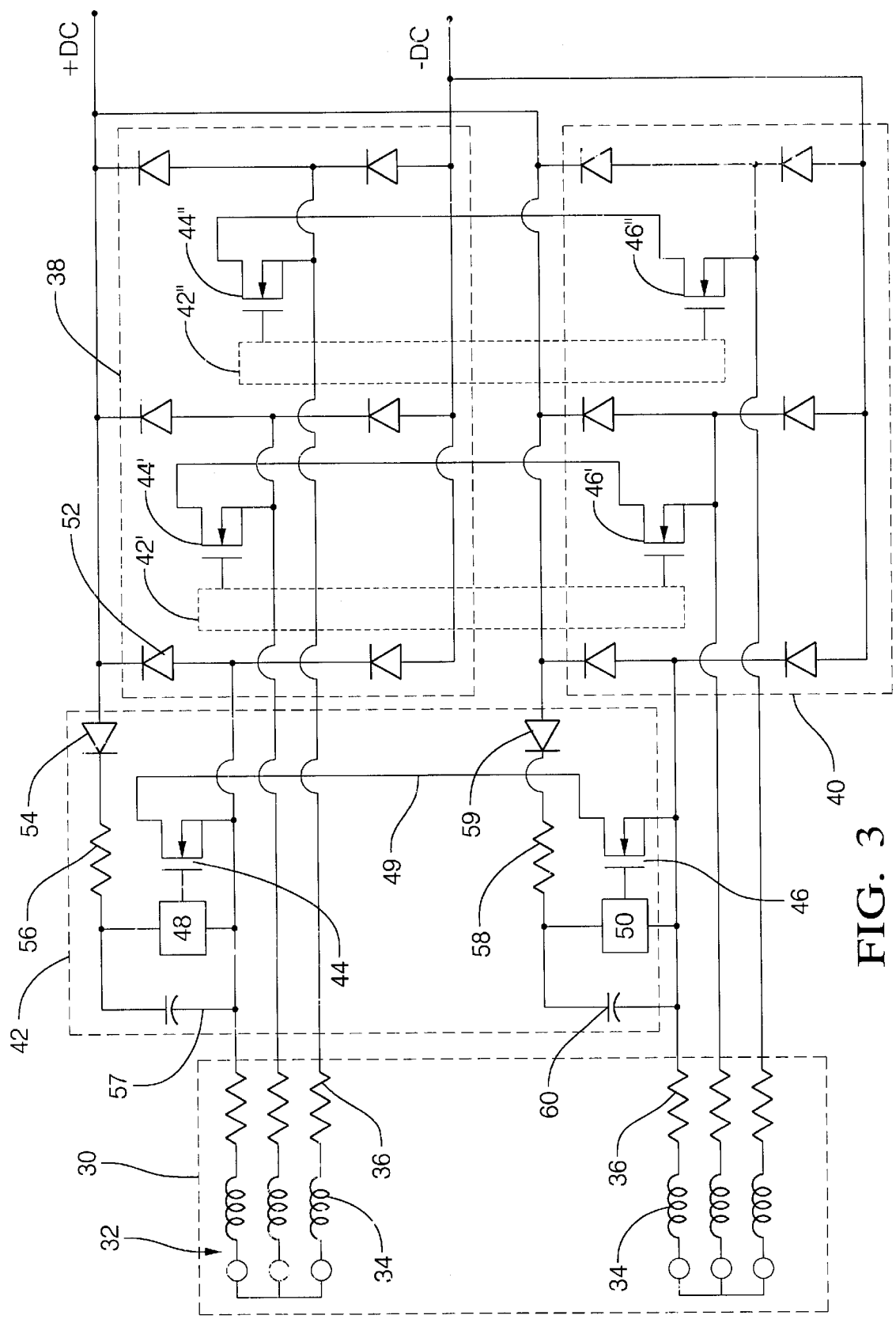
FIG. 3 is a detailed circuit diagram showing the first embodiment of the present invention, excluding the gate drive circuits.

FIG. 3 illustrates in detail the control circuit of a first embodiment of the present invention. In FIG. 3, generator 30 is shown as comprising two sets of three phase EMF sources 32 with phase inductances 34 and series resistances 36. The upper EMF sources are 180 degrees out of phase with the corresponding lower EMF sources. Rectifier bridges 38 and 40 comprise 6 diodes each.

Control circuit 42 for phase AA≅ is shown within the dotted rectangle, and it is to be understood that a similar control circuit is provided between the other two phases. As can be further seen, the drain terminals of the two MOSFETS, 44 and 46, are connected together (49). The gate terminal of MOSFET 44 is controlled by series-parallel mode control circuit 48, which determines whether the circuit operates in series or parallel, based on generator speed and output. The gate terminal of MOSFET 46 is controlled by synchronous rectifier control circuit 50, which allows the circuit to conduct current in either direction under excessive voltage situations. These control circuits are constructed according to any suitable electronic means known to those skilled in the art. Bias power for the gate drive of series-parallel mode control switch 48 is derived from the reverse voltage across diode 52 by diode 54, resistor 56, and capacitor 57, which serve to hold this voltage when diode 52 conducts. Similarly, synchronous rectifier control switch 50 is powered via diode 59, resistor 58, and capacitor 60. Bias power for the gate control circuits can also be derived from separate conventional floating supplies, as is well known in the art. Although this discussion has been limited to phase A, it is understood that similar control circuits control phases B and C.

FIG. 4A illustrates a schematic diagram of a second embodiment of the present invention, in which three MOSFETs have been substituted for two thyristors, with the understanding that the details of the circuit would be similar to FIG. 3. In this case, the lower winding is understood to be in phase with the corresponding upper winding. Instead of using two thyristors, the lower windings corresponding to two phases are connected to the upper winding corresponding to the third phase by three MOSFETs 60, 62 and 64. Each of the three MOSFETs is connected to the drain of the other two MOSFETs. The MOSFET control circuit combination could also be created by connecting the source terminals of the three MOSFETs together instead of the drain terminals. The functioning of the second embodiment of the present invention is similar to the first and it is to be understood that the details of the circuit would be similar. The gate terminal of MOSFET 64 is controlled by series-parallel mode control circuit 65. The gate terminals of MOSFETS 60 and 62 are controlled by synchronous rectifier control circuits 66 and 68 respectively. The three MOSFETs are controlled by these gate drive circuits to operate the circuit in series or parallel and to permit current to flow in either direction under excessive DC voltage situations. FIG. 4B shows the equivalent circuit.

The foregoing disclosure is intended merely to illustrate certain preferred embodiments of the invention. It is contemplated that those skilled in the art may find numerous ways to modify these embodiments without departing from the scope and spirit of the invention. As such, the scope of the invention is defined by the appended claims and not by the details of the specification.

We claim:

1. A generator control circuit for a three phase dual winding generator having upper and lower windings used with an automobile engine comprising:

a plurality of MOSFETs connected between said upper and lower windings;

a series-parallel mode control circuit;

two synchronous rectifier control circuits;

a first one of said plurality of MOSFETs controlled by said series-parallel mode control circuit;

a second one and a third one of said plurality of MOSFETs controlled by said synchronous rectifier control circuits;

whereby said generator control circuit determines whether winding sets of said generator are connected in series or parallel based on the speed of said engine wherein said plurality of MOSFETs connected between two phases of said lower winding and the third phase of said upper winding, said two phases of said lower winding and said third phase of said upper winding being in phase with each other.

2. The generator control circuit of claim 1 wherein said plurality of MOSFETs are connected by their drains.

* * * * *